(12) United States Patent
Tokumo et al.

(10) Patent No.: US 9,641,906 B2
(45) Date of Patent: May 2, 2017

(54) CONTENT TRANSMISSION DEVICE, CONTENT PLAYBACK DEVICE, CONTENT DISTRIBUTION SYSTEM, METHOD FOR CONTROLLING CONTENT TRANSMISSION DEVICE, METHOD FOR CONTROLLING CONTENT PLAYBACK DEVICE, CONTROL PROGRAM, AND RECORDING MEDIUM

(71) Applicant: Sharp Kabushiki Kaisha, Osaka-shi, Osaka (JP)

(72) Inventors: Yasuaki Tokumo, Osaka (JP); Takuya Iwanami, Osaka (JP); Shuichi Watanabe, Osaka (JP); Hideki Suzuki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/434,158

(22) PCT Filed: Oct. 4, 2013

(86) PCT No.: PCT/JP2013/077165
§ 371 (c)(1),
(2) Date: Apr. 8, 2015

(87) PCT Pub. No.: WO2014/057896
PCT Pub. Date: Apr. 17, 2014

(65) Prior Publication Data
US 2015/0296269 A1    Oct. 15, 2015

(30) Foreign Application Priority Data

Oct. 9, 2012   (JP) .................................. 2012-224236
May 14, 2013  (JP) .................................. 2013-102178

(51) Int. Cl.
H04N 7/173    (2011.01)
H04N 21/6373  (2011.01)
(Continued)

(52) U.S. Cl.
CPC ..... *H04N 21/6373* (2013.01); *H04N 21/2187* (2013.01); *H04N 21/238* (2013.01);
(Continued)

(58) Field of Classification Search
USPC ..................................................... 725/93–95
See application file for complete search history.

(56) References Cited

U.S. PATENT DOCUMENTS

2005/0071491 A1  3/2005  Seo
2012/0099656 A1  4/2012  Ohya et al.
(Continued)

FOREIGN PATENT DOCUMENTS

CN   102232298 A   11/2011
JP   2005-110244 A  4/2005
(Continued)

OTHER PUBLICATIONS

English translation of Official Communication issued in corresponding International Application PCT/JP2013/077165, mailed on Jan. 14, 2014.
(Continued)

*Primary Examiner* — Hunter B Lonsberry
(74) *Attorney, Agent, or Firm* — Keating & Bennett, LLP

(57) ABSTRACT

A content transmission unit (22) is provided that performs chunk transfer of a segment to a client (2) in subsegment unit, the subsegment being formed by dividing the segment into a plurality of pieces after receiving a request requiring transmission of the segment from the client (2).

2 Claims, 18 Drawing Sheets

(51) Int. Cl.
*H04N 21/238* (2011.01)
*H04N 21/845* (2011.01)
*H04N 21/2187* (2011.01)
*H04N 21/2662* (2011.01)
*H04N 21/462* (2011.01)

(52) U.S. Cl.
CPC ..... *H04N 21/2662* (2013.01); *H04N 21/4621* (2013.01); *H04N 21/8456* (2013.01)

(56) References Cited

U.S. PATENT DOCUMENTS

2013/0304916 A1* 11/2013 Hodapp ................ H04N 21/20
709/224
2014/0032777 A1    1/2014 Yuan et al.

FOREIGN PATENT DOCUMENTS

| JP | 2012-95053 A | 5/2012 |
| WO | 2012/011490 A1 | 1/2012 |
| WO | 2012/094199 A1 | 7/2012 |

OTHER PUBLICATIONS

"Information Technology—Dynamic Adaptive Streaming Over HTTP (DASH)—Part 1: Media Presentation Description and Segment Formats", International Standard, ISO/IEC 23009-1, Apr. 1, 2012, 134 pages.

* cited by examiner

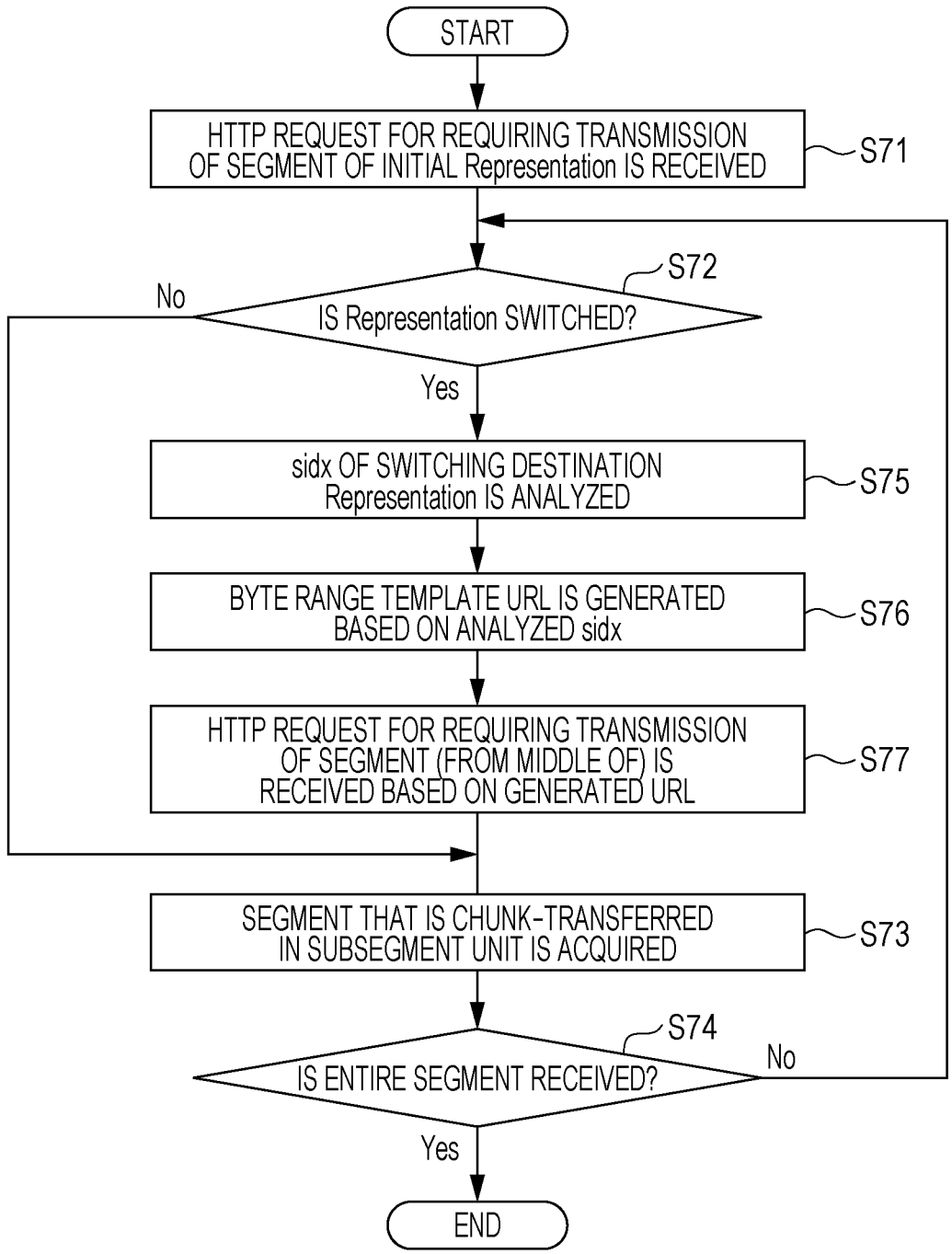

FIG. 5

<EXAMPLE OF MPD FOR LOW-DELAY LIVE STREAMING>

```
<MPD type="dynamic" profiles="urn:mpeg:dash:profile:isoff-low-latency-live:2012" minBufferTime="PT10S"> }110
 availabilityStartTime="2012-09-20T15:00:00">
 <Period start="PT0S" duration="PT3600S"> }120
  <BaseURL byterange="$base$/range$first$-$last$">http://cdn1.example.com/</BaseURL> }130
  <AdaptationSet>
   <Representation id="rep1" bandwidth="1024000">          ⎫
    <SegmentList duration=" PT600S ">                      ⎪
     <SegmentURL media="rep1-seg1.mp4"/>                   ⎪
     <SegmentURL media="rep1-seg2.mp4"/>                   ⎬ 141
     ...                                                   ⎪
     <SegmentURL media="rep1-seg6.mp4"/>                   ⎪
    </SegmentList>                                         ⎪
   </Representation>                                       ⎭
   <Representation id="rep2" bandwidth="512000">           ⎫
    <SegmentList duration="PT600S">                        ⎪
     <SegmentURL media="rep2-seg1.mp4"/>                   ⎪
     <SegmentURL media="rep2-seg2.mp4"/>                   ⎬ 142
     ...                                                   ⎪
     <SegmentURL media="rep2-seg6.mp4"/>                   ⎪
    </SegmentList>                                         ⎪
   </Representation>                                       ⎭
   ...
  </AdaptationSet>
  ...
 </Period>
 ...
</MPD>
```

FIG. 7

(a) REQUEST MESSAGE 81

GET /rep1-seg1.mp4 HTTP/1.1

(b) RESPONSE MESSAGE 83

HTTP/1.1 200 OK
Content-Type: video/mp4
Transfer-Encoding: chunked

{data body of rep1-seg1.mp4}

(c) REQUEST MESSAGE 87

GET /rep2-seg1.mp4/range/xxx-yyy/ HTTP/1.1

(d) RESPONSE MESSAGE 89

HTTP/1.1 200 OK
Content-Type: video/mp4
Transfer-Encoding: chunked

{data body of rep2-seg1.mp4}

FIG. 8

<EXAMPLE OF MPD FOR LOW-DELAY LIVE STREAMING>　　　　　　　　　　　　101

```
<MPD type="dynamic" profiles="urn:mpeg:dash:profile:isoff-low-latency-live:2012" minBufferTime="PT10S"
availabilityStartTime="2012-09-20T15:00:00">
 <Period start="PT0S" duration="PT3600S">
  <BaseURL byterange="$base$/range/$first$-$last$">http://cdn1.example.com/</BaseURL>   150
  <AdaptationSet subsegmentAlignment="true">
   <Representation id="rep1" bandwidth="1024000">
    <SegmentList duration="PT600S" maxChunkDuration="PT10S">
     <SegmentURL media="rep1-seg1.mp4"/>
     <SegmentURL media="rep1-seg2 .mp4"/>                      143
     ...
     <SegmentURL media="rep1-seg6.mp4"/>
    </SegmentList>
   </Representation>
   <Representation id="rep2" bandwidth="512000">
    <SegmentList duration="PT600S" maxChunkDuration="PT10S">
     <SegmentURL media="rep2-seg1.mp4"/>
     <SegmentURL media="rep2-seg2.mp4"/>                       144
     ...
     <SegmentURL media="rep2-seg6.mp4"/>
    </SegmentList>
   </Representation>
   ...
  </AdaptationSet>
  ...
 </Period>
</MPD>
```

FIG. 10
PRIOR ART

```
<EXAMPLE OF MPD FOR LIVE STREAMING: THERE ARE Representations OF TWO TYPES OF 1024 kbps AND 512 kbps>     ⎫ 200

<MPD type="dynamic" profiles="urn:mpeg:dash:profile:isoff-live:2011" minBufferTime="PT10S" availabilityStartTime="2012-  ⎫ 210
09-20T15:00:00">
  <Period start="PT0S" duration="PT3600S">  ⎫ 220
    <BaseURL>http://cdn1.exampte.com/</BaseURL>  ⎫ 230
    <AdaptationSet>
      <Representation id="rep1" bandwidth="1024000">              ⎫
        <SegmentList duration="PT600S">                           ⎪
          <SegmentURL media="rep1-seg1.mp4"/>                     ⎪
          <SegmentURL media="rep1-seg2.mp4"/>                     ⎬ 241
          ...                                                     ⎪
          <SegmentURL media="rep1-seg6.mp4"/>                     ⎪
        </SegmentList>                                            ⎪
      </Representation>                                           ⎭
      <Representation id="rep2" bandwidth="512000">               ⎫
        <SegmentList duration="PT600S">                           ⎪
          <SegmentURL media="rep2-seg1.mp4"/>                     ⎪
          <SegmentURL media="rep2-seg2.mp4"/>                     ⎬ 242
          ...                                                     ⎪
          <SegmentURL media="rep2-seg6.mp4"/>                     ⎪
        </SegmentList>                                            ⎪
      </Representation>                                           ⎭
    </AdaptationSet>
    ...
  </Period>
  ...
</MPD>
```

FIG. 12
PRIOR ART

<SYNTAX OF sidx DEFINED BY ISO/IEC 14496-12>

```
aligned(8) class SegmentIndexBox extends FullBox('sidx', version, 0) {
    unsigned int(32)       reference_ID;
    unsigned int(32)       timescale;
    if (version==0) {
        unsigned int(32)   earliest_presentation_time;
        unsigned int(32)   first_ offset;
    }
    else {
        unsigned int(64)   earliest_presentation_time;
        unsigned int(64)   first_ offset;
    }
    unsigned int(16)       reserved = 0;
    unsigned int(16)       reference_count;
    for(i=1; i <= reference_count; i++)
    {
        bit (1)            reference_ type;
        unsigned int(31)   referenced_size;
        unsigned int(32)   subsegment_duration;
        bit(1)             starts_ with_ SAP;
        unsigned int(3)    SAP type;
        unsigned int(28)   SAP_delta_time;
    }
}
```

FIG. 14
PRIOR ART (a) REQUEST MESSAGE 301

GET /rep1-seg1.mp4 HTTP/1.1

(b) RESPONSE MESSAGE 303

HTTP/1.1 200 OK
Content-Type: video/mp4

{data body of rep1-seg1.mp4}

(c) REQUEST MESSAGE 307

GET /rep2-seg1.mp4 HTTP/1.1
Range: bytes=xxx-yyy (d) RESPONSE MESSAGE 309

HTTP/1.1 206 Partial Content
Content-Type: video/mp4
Content-Range: bytes xxx-yyy/zzz {data body of rep2-seg1.mp4}

TRANSMISSION INFORMATION
(PROGRAM CONFIGURATION TABLE)

PROGRAM 1
      VIDEO PID=pid_b
      VIDEO PID=pid_a   isRef=1 RefPID=pid_b
      AUDIO PID=pid_c
   PROGRAM 2
      VIDEO PID=pid_m
      AUDIO PID=pid_n (b)

TRANSMISSION INFORMATION
(PROGRAM CONFIGURATION TABLE)

PROGRAM 1
      VIDEO PID=pid_b   pid_a
      AUDIO PID=pid_c
   PROGRAM 2
      VIDEO PID=pid_m
      AUDIO PID=pid_n

US 9,641,906 B2

CONTENT TRANSMISSION DEVICE, CONTENT PLAYBACK DEVICE, CONTENT DISTRIBUTION SYSTEM, METHOD FOR CONTROLLING CONTENT TRANSMISSION DEVICE, METHOD FOR CONTROLLING CONTENT PLAYBACK DEVICE, CONTROL PROGRAM, AND RECORDING MEDIUM

TECHNICAL FIELD

The present invention relates to a content transmission device that transfers content, a content playback device that acquires content and performs playback of the content, a content distribution system, a method for controlling the content transmission device, a method for controlling the content playback device, a control program, and a recording medium.

BACKGROUND ART

It has been widespread to distribute large volume content such as a moving image through the Internet with spread of the Internet or high performance of a computer. For example, there is a service called Video On Demand (VOD) which provides content such as a moving image in response to a user requirement. For example, as described in PTL 1, in the VOD, data is transmitted and received between a server (content providing device) and a client (content playback device) using HyperText Transfer Protocol (HTTP).

Here, various techniques have been developed for distribution of the content by HTTP. For example, a Motion Picture Experts Group (MPEG) has promoted an adaptive streaming technique using the HTTP to international standardization as a Dynamic Adaptive Streaming over HTTP (MPEG-DASH) standard.

In the MPEG-DASH, the content is time-divided into a plurality of segments and is transmitted in segment unit. Furthermore, each segment is constituted by one or a plurality of fragments. Furthermore, the content is constituted by one or a plurality of periods and one period includes one or a plurality of segments.

Furthermore, in the MPEG-DASH, a plurality of Representations are prepared in which quality types (types of bit rate, playback quality such as image, data format, and the like) are different for one content. For example, a plurality of segment data encoded at different bit rates are prepared for each segment. Thus, the client who receives the content and performs playback of the content can perform the adaptive streaming by changing the bit rate of the content (segment) to be required in accordance with a reception status of the content and the like.

Furthermore, in the MPEG-DASH, the content is associated with a Media Presentation Description (MPD) and the content is managed by the MPD. The MPD is metadata of the content and is obtained by describing management information of the content in an XML format. In other words, the MPD is information that is used in a case where the client acquires the content and performs playback of the content.

A detailed description example of the MPD will be described with reference to FIG. 10. FIG. 10 is a diagram illustrating a description example of the MPD. As illustrated in FIG. 10, information 210 including type information 211, profile information 212, buffering time information 213, and distribution start time information 214 is described in a MPD 200.

The type information 211 is information (attribute value of an attribute "type") indicating whether the distribution is live distribution or on-demand distribution. In the illustrated example, the attribute value of the attribute "type" is "dynamic" and it indicates that the content associated with the MPD 200 is the live distribution content. On the other hand, in a case of the on-demand distribution, "static" is described as the attribute value of the attribute "type".

The profile information 212 is information indicating a profile of the content. Furthermore, the buffering time information 213 is information indicating a minimum buffering time. In the illustrated example, an attribute value of an attribute "minBufferTime" is "PT10S", and it indicates that the client performs the buffering of at least 10 seconds.

The distribution start time information 214 is information (attribute value of an attribute "availabilityStartTime") indicating a time when a server starts live streaming distribution of the content. In the illustrated example, the attribute value of the attribute "availabilityStartTime" is "2012-09-20T15:00:00" and it indicates that the live streaming distribution is started at 15 o'clock, Sep. 20, 2012.

Furthermore, period information 220 regarding each period that is obtained by dividing a playback duration of the content is described in the MPD 200. In the illustrated example, as the period information 220, a start time (attribute value of an attribute "start") of the period with the distribution start time of the content as a standard and a duration (attribute value of an attribute "duration") of the period are described.

Furthermore, acquisition source information 230 indicating an acquisition source of the content is described. In the illustrated example, as the acquisition source information 230, a URL of the server is described.

Furthermore, here, as the content, high quality Representation in which a bit rate is 1024 kbps and low quality Representation in which the bit rate is 512 kbps are prepared. Thus, in the MPD 200, as a segment contained in a certain period (from 0 second to 3600 seconds of a playback time), high quality segment information 241 indicating a high quality segment and low quality segment information 242 indicating a low quality segment are described. In the high quality segment information 241, an ID and a bit rate of the high quality Representation contained in the period are described. Furthermore, a length and a URL of each segment contained in the period are described. This also applies to the low quality segment information 242. Moreover, the period is constituted by 6 segments of segment #1 to segment #6.

Next, a data structure of basic segment data of the related art will be described with reference to FIG. 11. FIG. 11 is a diagram illustrating the data structure of the segment data of the high quality segment and the low quality segment of the related art. Here, an example in which the segment data is described in a box format that is defined by ISOBFF (ISO/IEC 14496-12) is described.

As illustrated in FIG. 11(a), a high quality segment 260 of the related art is constituted by one Segment Type Box (styp) 261, one Segment Index Box (sidx) 262, and one or a plurality of sets of Movie Fragment Boxes (moof) 263, 265, 267, and 269, and Media Data Boxes (mdat) 264, 266, 268, and 270. Furthermore, as illustrated in FIG. 11(b), similar to the high quality segment 260, a low quality segment 280 is constituted by one styp 281, one sidx 282, and one or a plurality of sets of moof 283, 285, 287, and 289, and mdat 284, 286, 288, and 290.

The styp 261 and the styp 281 are information indicating the type of the segment and/or version information and the like. The sidx 262 and the sidx 282 are information regarding a random access point inside the segment. The moof 263, 265, 267, and 269, the mdat 264, 266, 268, and 270, the moof 283, 285, 287, and 289, and the mdat 284, 286, 288, and 290 are information regarding a fragment constituting the segment.

One set of the moof and the mdat constitutes one fragment. Furthermore, a unit constituted by one or a plurality of fragments and obtained by dividing the segment to adapt to the random access is referred to as a subsegment. For example, in the example of FIG. 11, the moof 263 and 265, and the mdat 264 and 266 constitute one subsegment. A byte size, time information, and the like of each subsegment are described in each of entries 271, 272, 291, and 292 of the sidx ("s0" and "s1" illustrated in FIGS. 11(*a*) and 11(*b*)).

Next, an example of a syntax of the sidx will be described with reference to FIG. 12. FIG. 12 is a diagram illustrating an example of the syntax of the sidx. Here, the sidx illustrates an example that is defined by ISO/IEC 14496-12.

As described above, in the MPEG-DASH, it is assumed to reduce the time length of the segment for shortening the time until the distribution can be performed from the generation start of the segment in the server, in order to support low-delay live streaming. Moreover, since processing delay by the server and the client, or delay on a network, and the like occur, it is not possible for the client to perform playback in real time in the strict meaning. Thus, the live streaming in substantially real time with slight delay is referred to as a low-delay live streaming.

CITATION LIST

Patent Literature

PTL 1: Japanese Unexamined Patent Application Publication No. 2005-110244 (Published on Apr. 21, 2005)

Non Patent Literature

NPL 1: "ISO/IEC 23009-1", [online], Apr. 1, 2012, ISO/IEC, [Searched on Sep. 26, 2012], Internet <URL: http://standards.iso.org/ittf/PubliclyAvailableStandards/c05 7623_ISO_IEC_23009-1_2012.zip>

SUMMARY OF INVENTION

Technical Problem

As described above, in the MPEG-DASH, the low delay live streaming is realized by shortening the time length of the segment, but a delay may occur due to the shortening of the time length of the segment. Specifically, if the time length of the segment is shortened, typically, in order to cope with network jitter, a plurality of requests requiring transmission of the segments are transmitted being pipelined. At this time, if a requested resource is not present in the server and thereby an error occurs, it is necessary to transmit a plurality of requests again and there is a problem that the delay occurs by the re-request.

The invention is made in view of the above problem and an object of the invention is to realize a content transmission device for stably performing low-delay live streaming, a content playback device, a content distribution system, a method for controlling the content transmission device, a method for controlling the content playback device, a control program, and a recording medium.

Solution to Problem

In order to solve the above problems, according to an aspect of the invention, there is provided a content transmission device that transmits content which is constituted by a plurality of segments and in which time information of a plurality of subsegments that are obtained by dividing the segment is described in a header of the segment to a content playback device, the content transmission device including: transmission means for transmitting a response to the content playback device in response to a request after receiving the request from the content playback device. The transmission means performs chunk transfer of the segment to the content playback device in subsegment unit in a case where the request requires transmission of the segment.

Furthermore, in order to solve the above problems, according to an aspect of the invention, there is provided a method for controlling a content transmission device that transmits content which is constituted by a plurality of segments and in which time information of a plurality of subsegments that are obtained by dividing the segment is described in a header of the segment to a content playback device, the method including: a transmission step of transmitting a response to the content playback device in response to a request if the request is received from the content playback device, in which in the transmission step, the segment is transferred by chunk transfer to the content playback device in subsegment unit in a case where the request requires transmission of the segment.

Furthermore, in order to solve the above problems, according to an aspect of the invention, there is provided a content playback device that acquires content which is constituted by a plurality of segments and in which time information of a plurality of subsegments that are obtained by dividing the segment is described in a header of the segment from a content transmission device and performs playback of the content, the content playback device including: acquisition means for transmitting a request for requiring transmission of the segment to the content transmission device. The acquisition means acquires the segment that is transferred by chunk transfer from the content transmission device in subsegment unit in response to the request.

Furthermore, in order to solve the above problems, according to an aspect of the invention, there is provided a method for controlling a content playback device according to an aspect of the invention that acquires content which is constituted by a plurality of segments and in which time information of a plurality of subsegments that are obtained by dividing the segment is described in a header of the segment from a content transmission device and performs playback of the content, the method including: a transmission step of transmitting a request requiring transmission of the segment to the content transmission device; and an acquisition step of acquiring the segment that is transferred by chunk transfer from the content transmission device in subsegment unit in response to the request.

Advantageous Effects of Invention

According to the aspects of the invention, it is possible to stably realize low-delay live streaming.

BRIEF DESCRIPTION OF DRAWINGS

FIG. 4 is a flowchart illustrating an example of a segment acquisition process that is performed by the client.

FIG. 5 is a diagram illustrating a description example of a MPD that is used in the invention.

FIG. 7 is a diagram illustrating an example of HTTP message that is transmitted and received in the low-delay live streaming.

FIG. 8 is a diagram illustrating another description example of the MPD that is used in the invention.

FIG. 10 is a diagram illustrating a description example of a MPD of the related art.

FIG. 12 is a diagram illustrating an example of a syntax of sidx according to the related art.

FIG. 14 is a diagram illustrating an example of a HTTP message that is transmitted and received in live streaming of the related art.

FIG. 19 is a diagram illustrating an example in which isRef and RefPID is stored in transfer information (program configuration table).

DESCRIPTION OF EMBODIMENTS

The following is description of an embodiment of the invention based on FIGS. 1 to 14. First, an outline of a content distribution system of the embodiment will be described with reference to FIG. 2.

[Outline of Content Distribution System]

Figure 2:
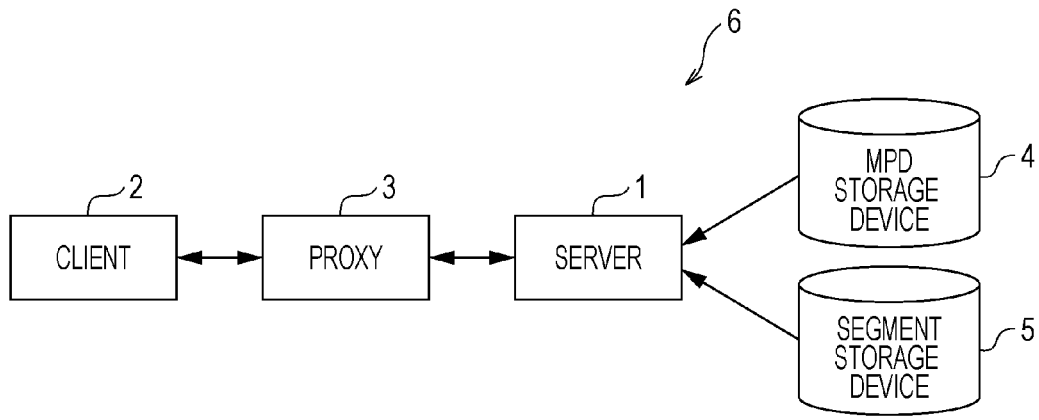
FIG. 2 is a diagram illustrating an outline of a content distribution system including the server and the client.

FIG. 2 is a diagram illustrating an outline of a content distribution system 6 according to the embodiment. As illustrated in FIG. 2, the content distribution system 6 includes a server 1, a client 2, a proxy 3, a MPD storage device 4, and a segment storage device 5.

As illustrated in FIG. 2, the client 2 is connected to the server 1 through the proxy 3. Furthermore, the server 1 is connected to the MPD storage device 4 and the segment storage device 5. Each device is connected to an arbitrarily network in a wired or wireless communication manner.

The server 1 is a content transmission device that receives a request for transmission of the content from the client 2 or the proxy 3 and transmits the content. The server 1 transmits MPD data to the client 2 or the proxy 3 in advance before transmitting data (segment data) of the content. Moreover, the server 1 acquires the MPD data and the segment data from the MPD storage device 4 and the segment storage device 5 on a network 7, but is not limited to this configuration. For example, each server 1 may locally hold the MPD data and the segment data.

The client 2 is a content playback device that performs playback of the content acquired from other devices such as the server 1 or the content stored in the client 2. For example, the client 2 is a digital television, a recorder, a Set Top Box (STB), a PC, a mobile phone, a smart phone, a game machine, a Personal Digital Assistant (PDA), a digital camera, a digital video, and the like.

The proxy 3 is a relay device that transfers data acquired from a certain device (the server 1 or the client 2) to another device (the client 2 or the server 1). For example, the proxy 3 transfers a request acquired from the client 2 to the server 1 and transfers the content acquired from the server 1 to the client 2.

Furthermore, since the proxy 3 caches the data (the MPD and the content) acquired from the server 1, the proxy 3 may be referred to as a Cache Server. Moreover, if the proxy 3 is referred to as the Cache Server, the server 1 is referred to as an Origin Server. At this time, if the proxy 3 acquires the request from the client 2 and holds the content indicated by the request, the proxy 3 may read and transmit the content to the client 2.

Furthermore, a configuration of the content distribution system 6 is not limited to the example illustrated in FIG. 2. For example, the content distribution system 6 may include a plurality of servers 1 or may include a plurality of clients 2. Furthermore, the content distribution system 6 may include a plurality of proxies 3.

Furthermore, in the embodiment, a transfer protocol on the network in the content distribution system 6 is HTTP that is widely used as a hypertext transfer protocol. Furthermore, the content that is distributed by the server 1 is a video content and the content is segmented ISOBFF data. That is, in the embodiment, the content distribution system 6 distributes the content based on the MPEG-DASH standard described above.

Furthermore, the content described in the invention is constituted by a plurality of segments and is content in which time information of the plurality of subsegments that are obtained by dividing the segment is described in a header of the segment. The time information of the subsegment is information indicating a time position of the subsegment and, for example, is information indicating a playback start time of the subsegment. Furthermore, in the invention, the segment may be divided into the subsegments in any unit, and, for example, the segment may be divided into the subsegments so that random access can be performed in subsegment unit. In other words, information indicating the time position of a random access point as time information of the subsegment may be described in a header of the segment.

[Configuration of Each Device]

Figure 1:
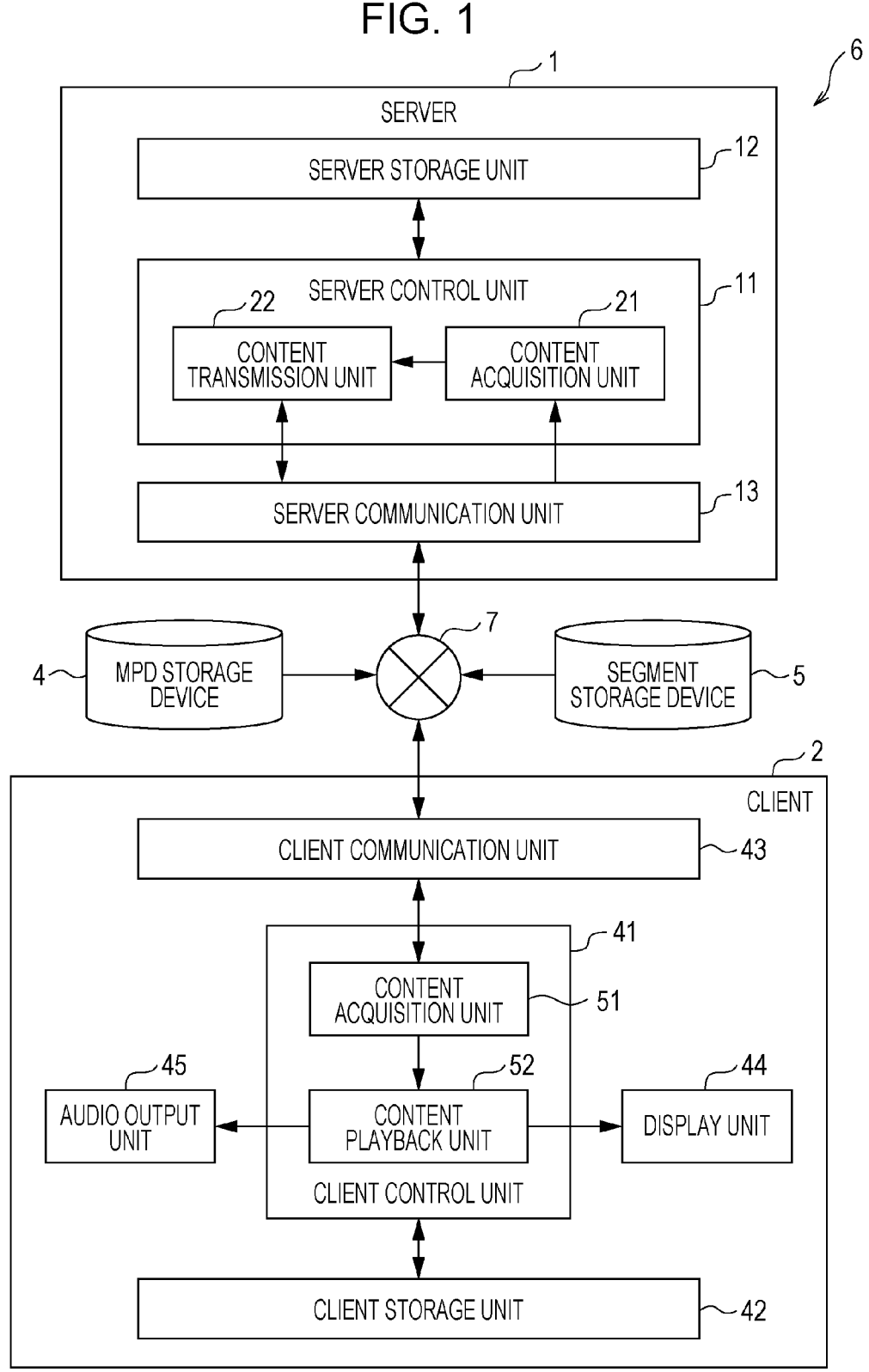
FIG. 1 is a block diagram illustrating a main configuration of a server and a client according to an embodiment of the invention.

Next, a main configuration of the server 1 and the client 2 will be described with reference to FIG. 1. FIG. 1 is a diagram illustrating an example of the main configuration of the server 1 and the client 2. Moreover, in FIG. 1, the proxy 3 is omitted.

(Server)

As illustrated in FIG. 1, the server 1 is constituted by a server control unit 11, a server storage unit 12, and a server communication unit 13.

The server communication unit 13 performs communication with other devices such as the client 2, the proxy 3, the MPD storage device 4, and the segment storage device 5 by wireless communication means or wired communication means, and performs exchange of the data according to an instruction of the server control unit 11.

The server control unit 11 performs various calculations by executing programs that is read with a temporal storage unit (not illustrated) from the server storage unit 12 and collectively controls the units included in the server 1.

In the embodiment, the server control unit 11 includes a content acquisition unit 21 and a content transmission unit (transmission means) 22 as functional blocks. Each functional blocks (21 and 22) of the server control unit 11 can be realized when a central processing unit (CPU) reads and executes a program stored in a storage device realized by a read only memory (ROM) and the like with the temporal storage unit realized by a random access memory (RAM) and the like.

The content acquisition unit 21 acquires the MPD data from the MPD storage device 4 or the segment data from the segment storage device 5 based on an instruction from the content transmission unit 22. The content acquisition unit 21 outputs the acquired MPD data or the segment data to the content transmission unit 22.

Moreover, the content acquisition unit 21 may acquire the MPD data and/or the segment data in advance regardless of presence or absence of the instruction from the content transmission unit 22. In this case, the content acquisition unit 21 stores the MPD data and the segment data that are acquired in the server storage unit 12 in advance and reads the MPD data and the segment data from the server storage unit 12 based on the instruction from the content transmission unit 22.

The content transmission unit 22 determines whether or not the received request is a request requiring the transmission of the segment in a case of receiving the request from the client 2. If the received request is the request requiring the transmission of the segment, the content transmission unit 22 instructs the content acquisition unit 21 to acquire the segment, acquires the segment data from the content acquisition unit 21, and transmits a response including the segment data to the client 2.

However, in the invention, the content transmission unit 22 does not transmit all the segment data at a time, but transmits the segment data in chunk unit in a case of transmitting the segment data. A plurality of subsegments formed by dividing the segment constitutes one chunk.

On the other hand, if the received request is not the request for requiring the transmission of the segment, the response to the request is transmitted to the client 2. For example, if the request for requiring the transmission of the content management information (MPD) is received from the client 2, the content transmission unit 22 instructs the content acquisition unit 21 to acquire the MPD of the content and if the MPD data is acquired from the content acquisition unit 21, the content transmission unit 22 transmits the response including the acquired MPD data to the client 2. Furthermore, when receiving a request for requiring transmission of a resource such as a Web page from the client 2, the content transmission unit 22 instructs the content acquisition unit 21 to acquire the resource and if the resource is acquired from the content acquisition unit 21, the content transmission unit 22 transmits the response including the acquired resource to the client 2.

Moreover, the content transmission unit 22 may determine whether or not the received request is the request for requiring the transmission of the segment based on whether or not a media type of the resource designated by the received request is the segment.

The server storage unit 12 stores a program or data, and the like referred to by the server control unit 11 and, for example, may store the MPD data and the segment data acquired by the content acquisition unit 21.

(Client)

As illustrated in FIG. 1, the client 2 includes a client control unit 41, a client storage unit 42, a client communication unit 43, a display unit 44, and an audio output unit 45. Moreover, the client 2 may include an operation unit, an audio input unit, and the like, but the units are not illustrated because the units have no relationship with the characteristics of the invention.

The client communication unit 43 performs communication with other devices such as the server 1 and the proxy 3 by wireless communication means or wired communication means and performs exchange of data according to instruction of the client control unit 41.

The display unit 44 displays an image according to instruction of the client control unit 41. The display unit 44 may display the image according to the instruction of the client control unit 41 and, for example, a liquid crystal display (LCD), an organic EL display, a plasma display, and the like may be used as the display unit 44.

The audio output unit 45 receives an electrical signal from the client control unit 41, converts the received electrical signal to sound, and outputs the sound to the outside of the client 2. The audio output unit 45 is a so-called speaker.

The client control unit 41 performs various calculations and collectively controls the units included in the client 2 by executing the programs read by the temporal storage unit (not illustrated) from the client storage unit 42.

In the embodiment, the client control unit 41 includes a content acquisition unit (acquisition means) 51 and a content playback unit 52 as a functional block. Each of the functional blocks (51 and 52) of the client control unit 41 can be realized by reading and executing the temporal storage unit in which a CPU realizes a program, using a RAM and the like, stored in a storage device realized by a ROM and the like.

The content acquisition unit 51 transmits the request to the server 1 through the client communication unit 43 and acquires the content (the MPD associated with the content and the segment configuring the content) from the server 1.

Specifically, the content acquisition unit 51 transmits the request requiring the transmission of the management information (MPD) of the content to the server 1 or the proxy 3 if content acquisition (playback) instruction is input from a user through an operation unit (not illustrated). Then, the content acquisition unit 51 receives the MPD data of the content as the response of the request. The content acquisition unit 51 transmits the request requiring the transmission of the segment configuring the content to the server 1 or the proxy 3 referring to the received MPD data. Then, the content acquisition unit 51 acquires the segment data of the content as the response of the request. The content acquisition unit 51 outputs the acquired segment data to the content playback unit 52.

Furthermore, if delay and the like of the network occur, the content acquisition unit 51 executes acquired Representation switching. At this time, then, if a part of remaining segment is acquired, the content acquisition unit 51 specifies a byte range of the subsegment including non-acquired data and transmits the request with a byte range template to the server 1 or the proxy 3 based on the specified byte range.

The content playback unit 52 refers to the MPD data and performs playback of the content based on the acquired segment data in a case of acquiring the segment data from the content acquisition unit 51.

The client storage unit 42 stores a program or data, and the like referenced by the client control unit 41 and, for example, may store the MPD data and the segment data acquired by the content acquisition unit 51.

[Process of Server]

Figure 3:
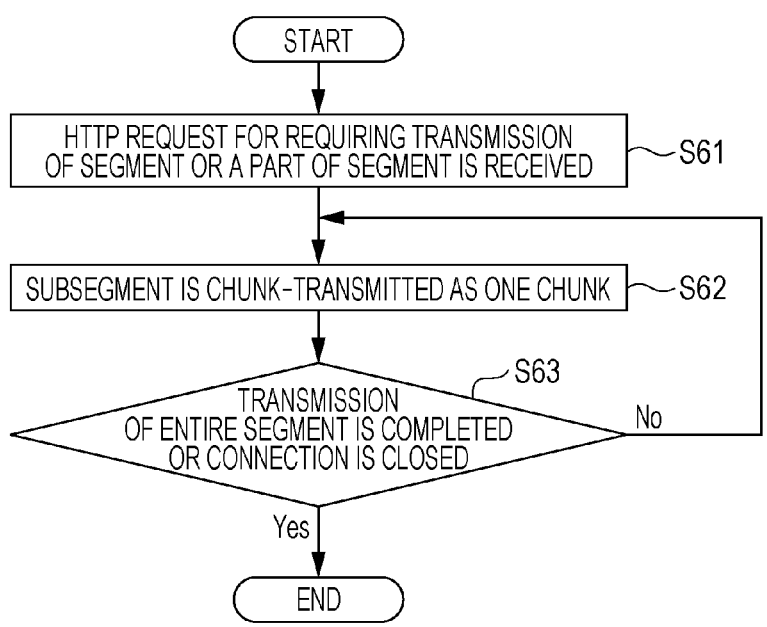
FIG. 3 is a flowchart illustrating an example of a segment transmission process that is performed by the server.

Next, a segment transmission process of the server 1 will be described with reference to FIG. 3. FIG. 3 is a flowchart illustrating an example of the segment transmission process of the server 1.

As illustrated in FIG. 3, the server 1 receives a HTTP request message requiring transmission of the segment or a part of the segment from the client 2 (S61). The content transmission unit 22 instructs the content acquisition unit 21 to acquire the segment and acquires the segment data from the content acquisition unit 21. Then, the content transmission unit 22 transmits, to the client 2, the segment by chunk unit in which the plurality of subsegments formed by dividing the segment are used as one chunk (S62).

The content transmission unit 22 transmits the segment by chunk unit and if an entire required segment is transmitted (YES in S63), the segment transmission process is completed. Otherwise, if connection is closed in the middle thereof (YES in S63), the segment transmission process is completed by the content transmission unit 22.

[Process of Client]

Next, a segment acquisition process of the client 2 will be described with reference to FIG. 4. FIG. 4 is a flowchart illustrating an example of the segment acquisition process of the client 2.

As illustrated in FIG. 4, first, the content acquisition unit 51 refers the MPD data and transmits the request requiring the transmission of a segment (for example, a high quality segment) of initial Representation (S71).

After the request is transmitted, the content acquisition unit 51 determines whether or not Representation is switched (S72). Here, if the delay and the like of the network does not occur, the content acquisition unit 51 acquires the segment that is chunk-transferred by subsegment unit from the server 1 (S73) without Representation switching (NO in S72). The content acquisition unit 51 determines whether or not the entire requested segment is received (S74), and if the entirety is not received (NO in S74), the process proceeds returns to S72.

Here, if the delay and the like of the network occur, the content acquisition unit 51 switches Representation of the acquired segment (YES in S72). The content acquisition unit 51 analyzes sidx of Representation (for example, low quality segment) of a switching source and specifies a byte range of a non-acquired subsegment based on an access point of the non-acquired subsegment of the requested segments (S75). The content acquisition unit 51 generates a byte range template URL indicating an acquisition source of the non-acquired subsegment based on the specified byte range (S76). The content acquisition unit 51 transmits the request for requiring the transmission of the remaining data (data from the middle thereof) of the segment based on the generated URL (S77). Then, the content acquisition unit 51 acquires the segment of epresentation of the switching destination by chunk unit from the middle thereof (S73).

Thus, the process until the entire segment is received is performed and if the entire segment is received (YES in S74), the segment acquisition process is completed.

[Description Example of MPD]

Next, a description example of the MPD used in the invention will be described with reference to FIG. 5. FIG. 5 is a diagram illustrating the description example of the MPD used in the invention.

As illustrated in FIG. 5, profile information 112 and acquisition source information 130, that are included in information 110, of a MPD 100 used in the invention are different from those of the MPD 200 of the related art illustrated in FIG. 10.

Specifically, in the MPD 100, "urn:mpeg:dash:profile:isoff-low-latency-live:2012" indicating low delay live distribution is described in the profile information 112. Furthermore, the byte range template (BaseURL@byterange) is described in the acquisition source information 130 instead of the URL of a mere server.

[Byte Range Request]

In the related art, if the client 2 acquires a part of the content, the client 2 can acquire a part thereof by a byte range request defined in HTTP/1.1. However, in the response from the server 1 with respect to the byte range request, since a status code is "206", the proxy 3 does not cache the data included in the response. Thus, even if the same content is re-requested to the server 1 through the proxy 3, since the proxy 3 is not cached, the server 1 must transmit the content. Thus, it is difficult to stably realize low delay live streaming.

Figure 13:
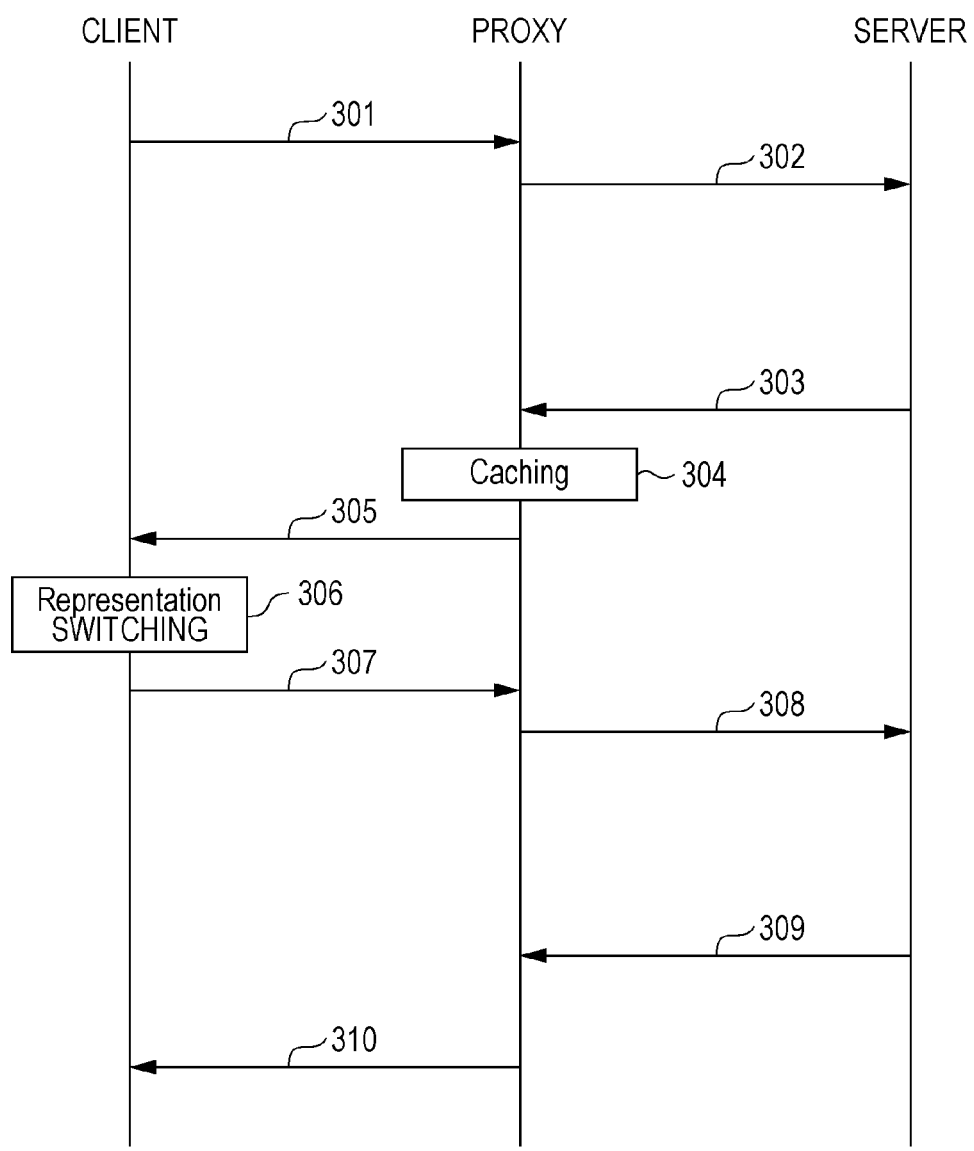
FIG. 13 is a diagram illustrating an example of an operation sequence of a server, a client, and a proxy transmitting and receiving a part of content by a byte range request according to the related art.

An operation sequence of the server, the client and the proxy that transmit and receive a part of the content by the byte range request, and a HTTP message that is transmitted and received in live streaming of the related art will be described with reference to FIGS. 13 and 14 in detail below. FIG. 13 is a diagram illustrating an example of the operation sequence of the server, the client, and the proxy that transmit and receive a part of the content by the byte range request. Furthermore, FIG. 14 is a diagram illustrating an example of the HTTP message that is transmitted and received in live streaming of the related art.

As illustrated in FIGS. 13 and 14, first, the client refers the MPD 200 and transmits a request message 301 for requiring transmission of a message #1 to the proxy. The proxy receives the request message 301 and since a segment #1 is not cached, the proxy transfers the request as it is and transmits a request message 302 to the server.

Since the request message 302 requires the transmission of the segment, the server transmits a response message 303 including a data body of the segment #1 to the proxy as the response of the request message 302. The proxy receives the response message 303 and since a status code of the response message 303 is "200", the proxy performs caching 304 of the data included the response message 303, transfers the response as it is, and transmits a response message 305 to the client. The client receives the response message 305 and acquires the segment #1.

Here, since the delay of the network and the like occur, the client executes representation switching 306. Then, the client analyzes the sidx and specifies byte ranges (xxx to yyy) of the non-acquired data of the segment #1. The client transmits a byte range request message 307 to the proxy based on the specified byte range. The proxy receives the request message 307 and also in here, since the data indicating the request is not cached, the proxy transfers the request as it is and transmits a request message 308 to the server.

Since the request message 308 is the byte range request, the server 1 transmits a response message 309 of a status code "206" including the data of a designated byte range that is a part of the segment #1 to the proxy as the response of the request message 308. The proxy receives the response message 309 and since the status code of the response message 309 is "206", the proxy does not cache the data included in the response message 309 and transfers the response as it is, and transmits a response message 310 to the client. The client receives the response message 310 and acquires the remaining data of the segment #1.

As described above, if a part of the content is transmitted and received by the byte range request, since the status code of the response is "206", the proxy 3 does not cache. Moreover, the data that is cached by the proxy 3 is the data included in the response in which the status code is "200", "203", "300", "301", or "410".

In the MPEG-DASH, it is also possible to realize low delay live streaming by reduction of a Round Trip Time (RTT) by cache hit in the proxy 3 that is a cache server. Thus, if there is data that is not cached by the proxy 3, it is difficult to stably realize the low delay live streaming.

In a case of acquiring a part of the segment in the byte range request, in order to solve the above problem that is not cached in the proxy 3, in the invention, a part of the segment is acquired in the request using the byte range template described above. As described below, in response to the request using the byte range template, since the status code is "200", the proxy 3 can cache the data included in the response.

[First Embodiment]

Figure 6:
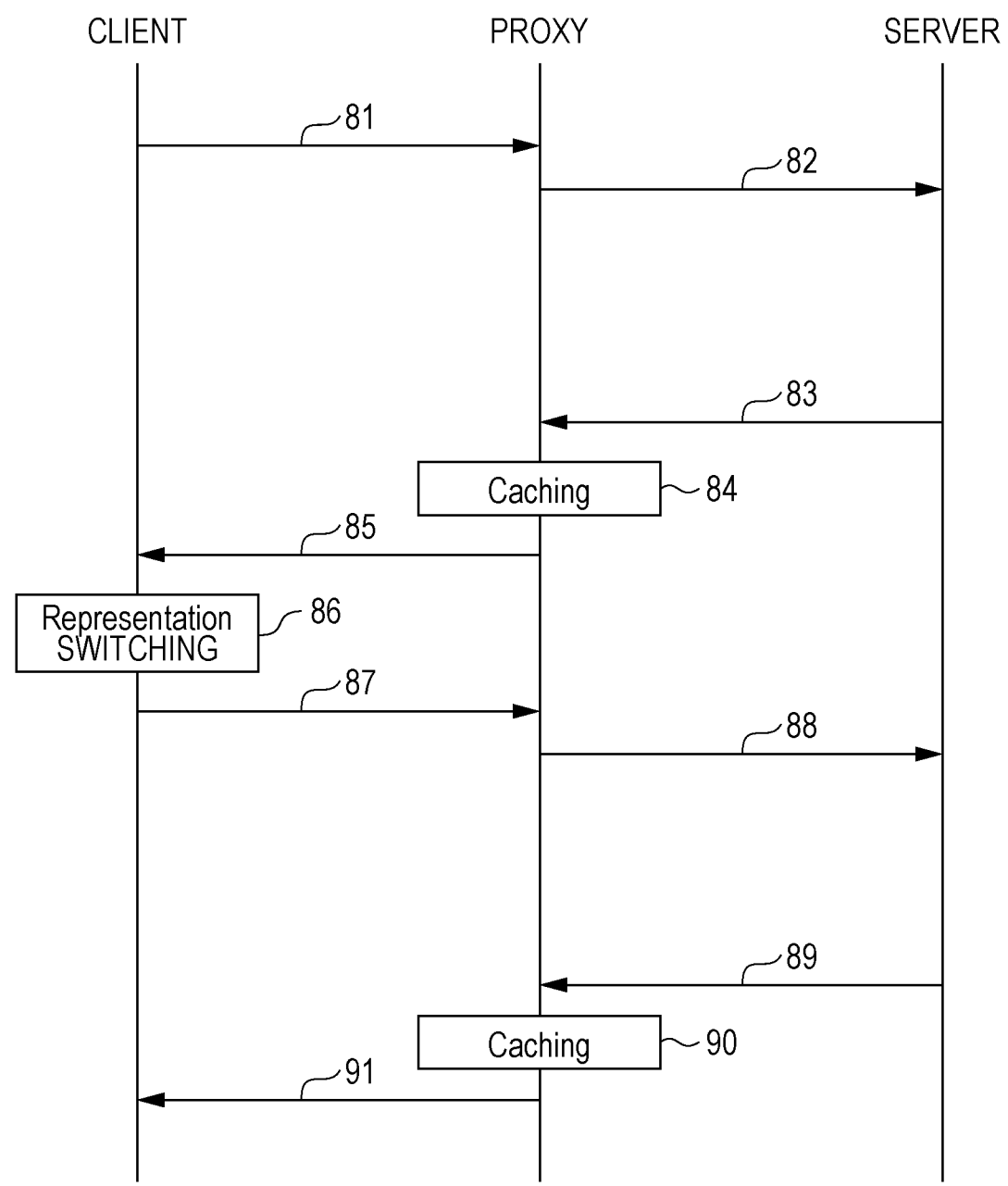
FIG. 6 is a diagram illustrating an example of an operation sequence of the server, the client, and a proxy performing low-delay live streaming.

Next, the operation sequence of the server 1, the client 2, and the proxy 3 executing the low delay live streaming, and the HTTP message that is transmitted and received in the low delay live streaming will be described with reference to FIGS. 6 and 7. FIG. 6 is a diagram illustrating an example of the operation sequence of the server 1, the client 2, and the proxy 3 executing the low delay live streaming. Furthermore, FIG. 7 is a diagram illustrating an example of the HTTP message that is transmitted and received in the low delay live streaming.

As illustrated in FIGS. 6 and 7, first, the client 2 refers a MPD 70 and transmits a request message 81 for requiring the transmission of the message #1 to the proxy 3. The proxy 3 receives the request message 81 and, since the message #1 is not cached, the proxy 3 transfers the request as it is, and transmits a request message 82 to the server 1.

Since the request message 82 requires the transmission of the segment, the server 1 transmits a response message 83 including the data body of the segment #1 that is chunk-divided by subsegment unit to the proxy 3 as the response of the request message 82. The proxy 3 receives the response message 83 and since the status code of the response message 83 is "200", the proxy 3 performs caching 84 of data included in the response message 83, transfers the response as it is, and transmits a response message 85 to the client 2. The client 2 receives the response message 85 and acquires the segment #1 that is chunk-transferred by subsegment unit.

Here, since the delay and the like of the network occur, the client 2 executes Representation switching 86. The client 2 analyzes the sidx and specifies the byte ranges (xxx to yyy) of the subsegment including the non-acquired data of the segment #1. The client 2 transmits a request message 87 using the byte range template to the proxy 3 based on the specified byte range rather than the byte range request. The proxy 3 receives the request message 87 and since the data indicating the request is also not cached, the proxy 3 transfers the request as it is and transmits a request message 88 to the server 1.

Since the request message 88 is a usual request rather than the byte range request, the server 1 transmits a response message 89 of the status code "200" including the subsegment of the designated byte range as the response of the request message 88 to the proxy 3 by chunk unit. The proxy 3 receives the response message 89 and since the status code of the response message 89 is "200", the proxy 3 performs caching 90 of the data included in the response message 89, transfers the response as it is, and transmits a response message 91 to the client 2. The client 2 receives the response message 91 and acquires the remaining data of the segment #1 by chunk unit.

[Other Description Example of MPD]

In the invention, the segment is further divided into the plurality of subsegments, but a time length of the subsegment may be arbitrarily. That is, the time length of each subsegment may not be constant and the time lengths of the subsegments may be different from each other.

Furthermore, in the invention, since the chunk transfer is performed by subsegment unit, the time length of the subsegment matches a time length of one chunk. The client 2 can predict a delay amount in the live streaming by grasping the time length of the chunk in advance. Thus, it is preferable that the time length of the chunk is described in the MPD. If the time length of the chunk is fixed, for example, the time length of the chunk may be described in the MPD. Furthermore, if the time length of the chunk is variable, for example, the maximum value and/or the minimum value of the time length of the chunk may be described in the MPD. A description example of the time length of the chunk will be described below.

Furthermore, in the MPEG-DASH, in order to switch Representation, it is preferable that boundaries of the subsegments respectively corresponding between Representations are uniform. In other words, it is preferable that playback start times of the subsegments respectively corresponding between Representations match each other. In this case, even if Representation is switched, since the playback times of the subsegments are match each other, it is possible to perform the playback particularly without a problem.

On the other hand, if the boundaries of the subsegments corresponding between Representations are not uniform, since the boundaries must be made uniform and the playback is performed after switching of Representation, it is preferable the client 2 grasps whether or not the boundaries of the subsegments are uniform in advance. Thus, it is preferable that information regarding arrangement of the subsegments indicating whether or not the boundaries of the subsegments are uniform is described in the MPD. The information regarding the arrangement of the subsegments will be described later.

Next, another description example of the MPD using in the invention will be described with reference to FIG. 8. FIG. 8 is a diagram illustrating another description example of the MPD using in the invention. In FIG. 8, an example of the MPD in which the information regarding the arrangement of the subsegments and the information regarding the time length of the chunk are described is illustrated.

As illustrated in FIG. 8, in MPD 101 used in the invention, the information regarding the arrangement of the subsegments and the information regarding the time length of the chunk are additionally described as comparing with the MPD 100 illustrated in FIG. 5.

Specifically, an attribute "AdaptationSet@subsegmentAlignment" and an attribute value "true" thereof are described in the MPD 101 as information 150 regarding the arrangement of the subsegments. The attribute value "true" indicates that the boundaries of the subsegments are uniform and if the boundaries of the subsegments are not uniform, "false" is described as the attribute value.

Furthermore, in the MPD 101, an attribute "maxChunkDuration" and an attribute value "PT10S" are described in high quality segment information 143 and low quality segment information 144 as the information regarding the time length of the chunk. The attribute "maxChunkDuration" indicates the maximum value of a variable time length of the chunk and the attribute value "PT10S" indicates that the maximum value is 10 seconds. As described above, as the information regarding the time length of the chunk, the attribute "chunkDuration" indicating the fixed time length of the chunk may be described or an attribute "minChunkDuration" indicating the minimum value of the variable time length of the chunk may be described.

Furthermore, the attribute "chunkDuration" described above may be interpreted as a time length of an initial chunk of the segment. Otherwise, an attribute "chunkDurationOffset" indicating a difference value between the time length (equal to a value of an attribute "SegmentList@duration") of the segment and the time length (equal to a value of an attribute "SegmentList@chunkDuration") of the initial chunk of the segment may be described instead of the attribute "chunkDuration".

[Exchanging Example of Representation if Boundaries of Subsegments are not Uniform]

Figure 9:
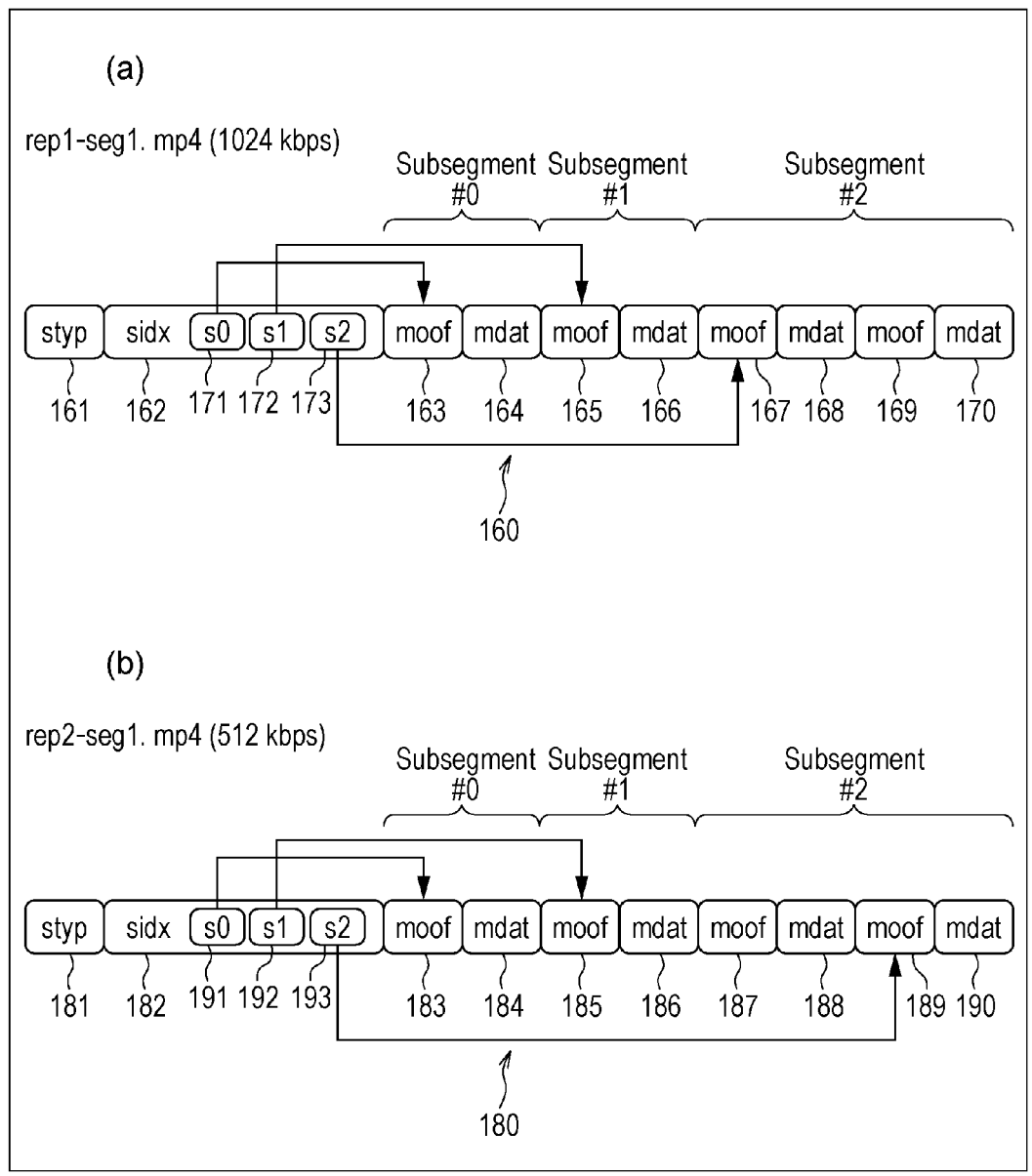
FIG. 9 is a diagram illustrating a data structure of segment data of a high quality segment and a low quality segment which are not the same in a boundary of each subsegment.
Figure 11:
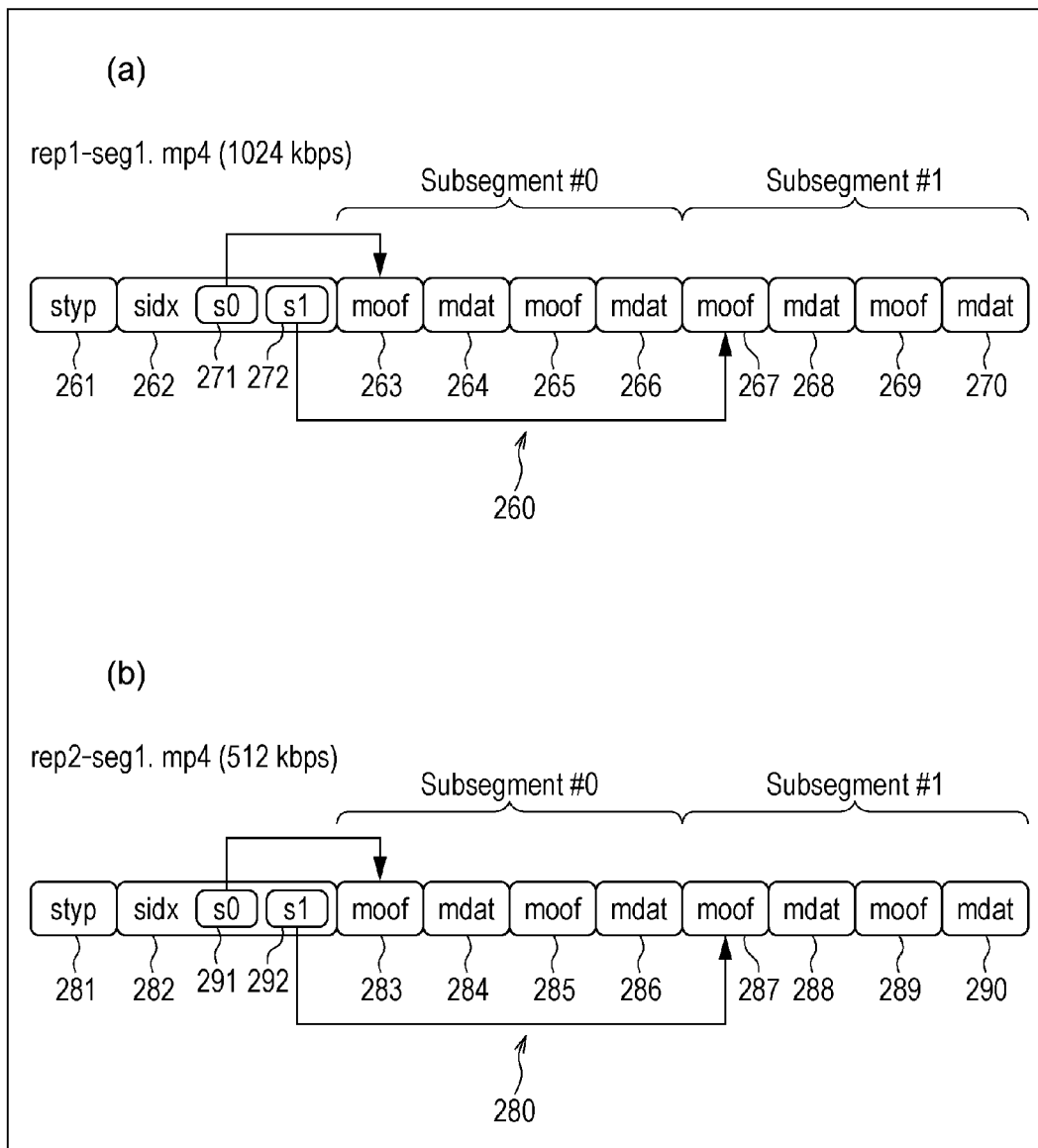
FIG. 11 is a diagram illustrating a data structure of segment data of the high quality segment and the low quality segment of the related art.

Next, if the boundaries of the subsegments are not uniform, switching of Representations will be described with reference to FIG. 9. FIG. 9 is a diagram illustrating a data structure of the segment data of the high quality segment and the low quality segment which are not the same in the boundaries of the subsegments.

As illustrated in FIG. 9(a), a high quality segment 160 of 1024 kbps includes a subsegment #0 formed of a moof 163 and a mdat 164, the segment #1 formed of a moof 165 and a mdat 166, and a segment #2 formed of moof 167 and 169, and mdat 168 and 180. On the other hand, a low quality segment 180 of 512 kbps includes a subsegment #0 formed of a moof 183 and a mdat 184, the segment #1 formed of moof 185 and 187, and mdat 186 and 188, and a segment #2 formed of a moof 189 and a mdat 190. That is, the playback start time of the segment #2 is different in the high quality segment 160 and the low quality segment 180.

Moreover, a time length of a fragment (moof and mdat) included in the high quality segment 160 and the low quality segment 180 is constant. That is, fragments 163 to 170 of the high quality segment respectively correspond to fragments 183 to 190 of the low quality segment.

Here, Representation is switched and the low quality segment is acquired after acquiring to the segment #1 of the high quality segment. In this case, the data to be acquired next is the moof 187 of the low quality segment corresponding to the moof 167 of the high quality segment. However, in the low quality segment 180, since the moof 185 and 187, and the mdat 186 and 188 become the subsegment #1, it is not possible to acquire only after the moof 187. Thus, the acquisition is started from the subsegment #1 including the moof 187 that is the non-acquired data such that a gap does not occur in a case of performing the playback. At this time, the moof 185 and the mdat 186 are obtained by being overlapped in time, but the live streaming is realized by adjusting the moof 185 and the mdat 186 in a case of performing the playback.

Moreover, as described above, time information of each subsegment is described in the sidx 162 and 182 that is a header of the segment and the byte range is specified by analyzing the sidx.

[Conclusion]

According to an aspect of the invention, there is provided a content transmission device that transmits content which is constituted by a plurality of segments and in which time information of a plurality of subsegments that are obtained by dividing the segment is described in a header of the segment to a content playback device, the content transmission device including transmission means for transmitting a response to the content playback device in response to a request after receiving the request from the content playback device. The transmission means performs chunk transfer of the segment to the content playback device in subsegment unit in a case where the request requires transmission of the segment.

According to an aspect of the invention, there is provided a method for controlling a content transmission device that transmits content which is constituted by a plurality of segments and in which time information of a plurality of subsegments that are obtained by dividing the segment is described in a header of the segment to a content playback device, the method including a transmission step of transmitting a response to the content playback device in response to a request if the request is received from the content playback device. In the transmission step, the segment is transferred by chunk transfer to the content playback device in subsegment unit in a case where the request requires transmission of the segment.

In the above configuration, the transmission means perform chunk transfer of the segment by dividing the segment into a plurality of subsegments in response to the request requiring the transmission of the segment. That is, the segment is transmitted in subsegment unit that is shorter in time than in segment unit and the transfer of the plurality of subsegments can be required by one request. Thus, it is possible to suppress an error process associated with pipelining of a plurality of requests while shortening a time until the distribution can be performed from the generation start of the subsegment. Accordingly, it is possible to stably realize the low delay live streaming.

Furthermore, in the content transmission device according to an aspect of the invention, the segment may be divided into the subsegments so as to enable random access in subsegment unit.

Furthermore, in the content transmission device according to an aspect of the invention, the transmission means may transmit content management information in which the time length of the subsegment is described to the content playback device in a case where the time length of each subsegment is constant.

Furthermore, in the content transmission device according to an aspect of the invention, the transmission means may transmit content management information in which at least one of the maximum value and the minimum value of the time length of the subsegment is described to the content playback device in a case where the time length of each subsegment is different.

In the above configuration, since the client can grasp the time length of the subsegment that is chunk-transferred, it is possible to predict the delay amount in the live streaming.

According to an aspect of the invention, there is provided a content playback device that acquires content which is constituted by a plurality of segments and in which time information of a plurality of subsegments that are obtained by dividing the segment is described in a header of the segment from a content transmission device and performs playback of the content, the content playback device including acquisition means for transmitting a request for requiring transmission of the segment to the content transmission device. The acquisition means acquires the segment that is transferred by chunk transfer from the content transmission device in subsegment unit in response to the request.

According to an aspect of the invention, there is provided a method for controlling a content playback device that acquires content which is constituted by a plurality of segments and in which time information of a plurality of subsegments that are obtained by dividing the segment is described in a header of the segment from a content transmission device and performs playback of the content, the method including a transmission step of transmitting a request requiring transmission of the segment to the content transmission device; and an acquisition step of acquiring the segment that is transferred by chunk transfer from the content transmission device in subsegment unit in response to the request.

[Second Embodiment]

Regarding the delay occurring on the network between the server and the client, in the first embodiment, if an error occurs due to the fact that the resource requested by the client does not exist in the server, there is a problem that a load is applied on the network and the client, and the delay occurs because a plurality of requests are transmitted again. Regarding the delay occurring in the client, since a processing ability of a decoder included in the client is low, there is also a problem that a load is applied and the delay occurs in the decode process.

Figure 15:
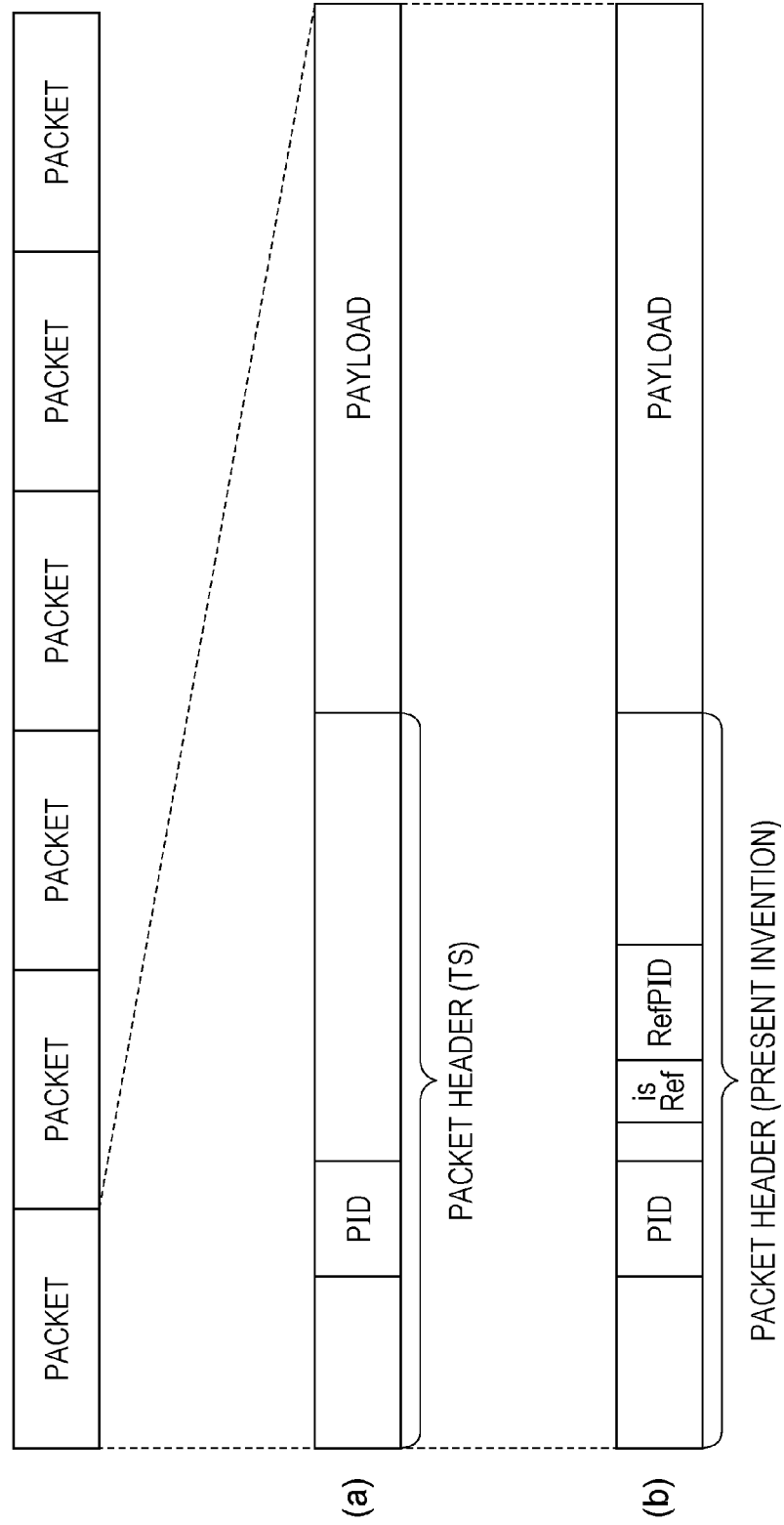
FIG. 15 is a diagram illustrating an example of a configuration of a transfer stream.
Figure 16:
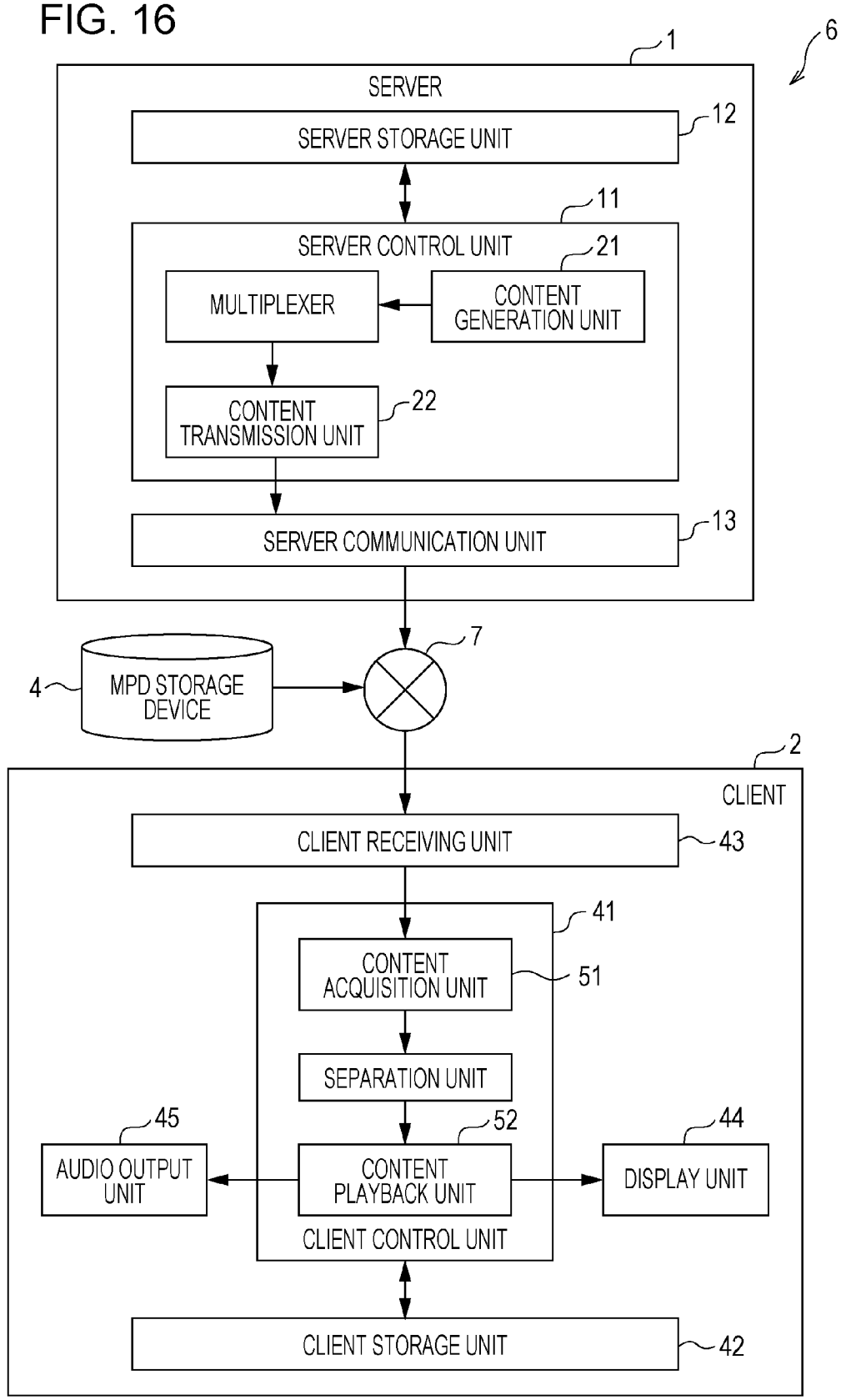
FIG. 16 is a block diagram illustrating a main configuration of a server and a client of another embodiment of the invention.
Figure 17:
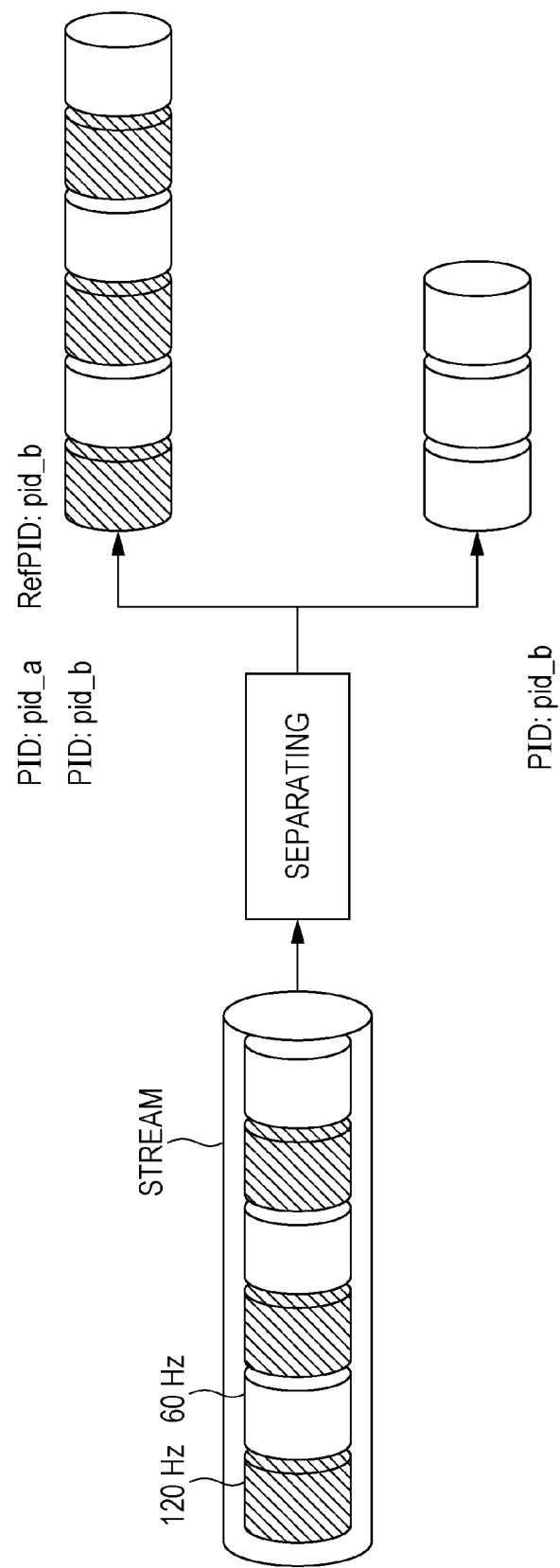
FIG. 17 is a diagram illustrating a process in which a multiplexed stream is separated on a receiving side.
Figure 18:
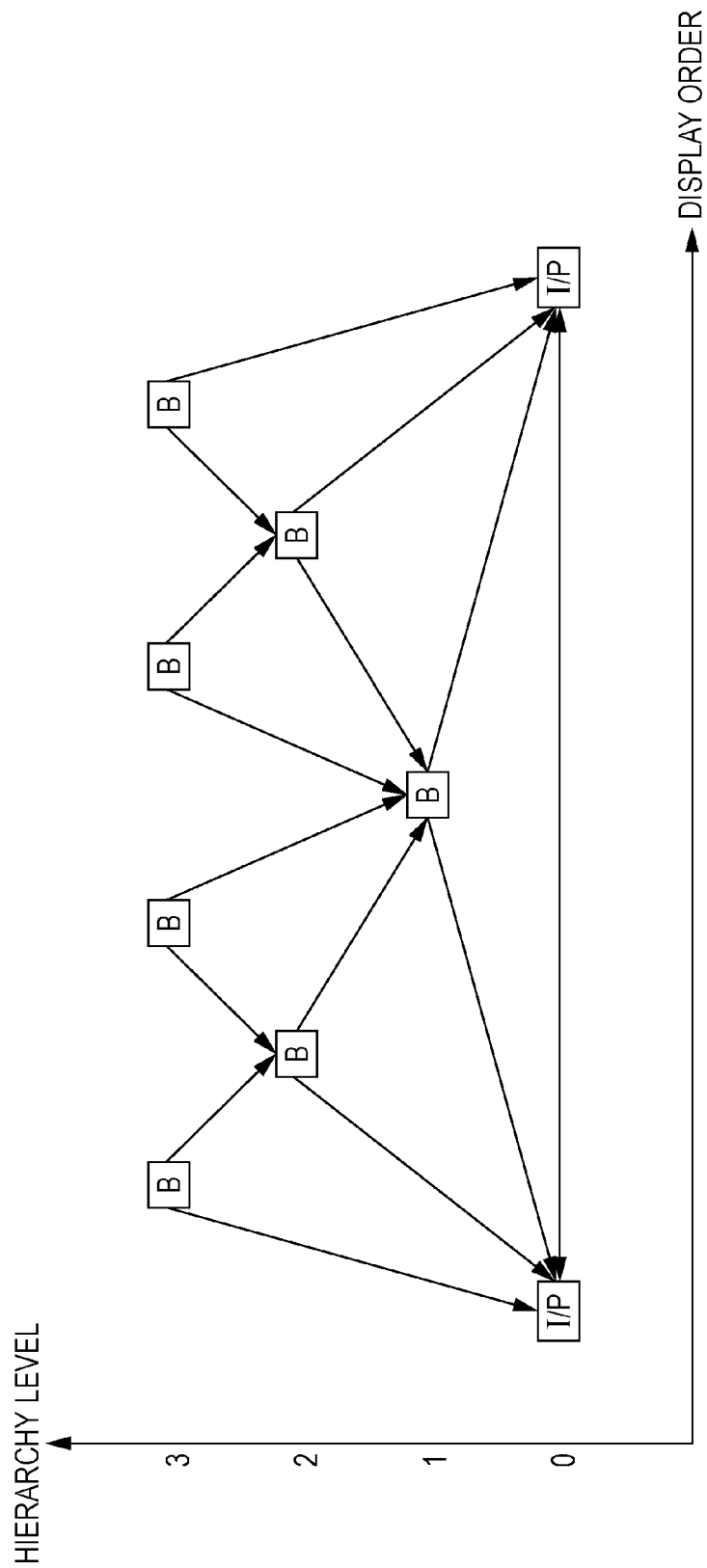
FIG. 18 is a diagram illustrating an example of a picture and a hierarchy level in the content.

In the embodiment, a method for eliminating the delay occurring during a decoding process by extracting appropriate information in the content depending on a decode processing ability of the client will be described below with reference to FIGS. 15 to 18. FIG. 15 is a diagram illustrating an example of a configuration of a transfer stream according to the embodiment. FIG. 16 is a block diagram illustrating a main configuration of the server and the client of the embodiment. Furthermore, FIG. 17 is a diagram illustrating a process in which a stream obtained by multiplexing a plurality of frame rate data according to the embodiment is separated on a receiving side. FIG. 18 is a diagram illustrating a picture and a hierarchy level in the content according to the embodiment.

In current digital broadcasting, a broadcasting station corresponding to the server stores a plurality of data of video, audio, and other program information respectively in a plurality of packets, and transmits the packets by multiplexing the packets into one stream. For the multiplexing, a MPEG-2 TS (transport stream) is used which is a stream format of MPEG. Multiplexed transport stream (TS) is separated into each packet by a broadcasting receiver that is the client and data such as video or audio, and the like are acquired.

FIG. 15(a) illustrates a structure of the TS of the related art. The TS is constituted by an assembly of TS packets respectively having 188 bytes. The TS packets are input into the client in time series manner. At this time, as illustrated in FIG. 15(a), a Packet Identifier (PID) indicating type of data in the packet is allocated to a header of each TS packet and a separating unit identifies and separates video, audio, associated information, and the like stored in a payload of the packet using this value, and then can input the data to an appropriate decoder.

In the TS, the same PID is allocated to the packets in which the video data composed of a plurality of video qualities that are scalable coded is separated and stored. Then, the client can separate the plurality of video qualities in a stage of a decoding process. That is, one video data is transmitted with one PID.

On the other hand, in the TS of the related art, the contents to which different PID are allocated cannot be recognized as the same content. For example, in the video data compressed by a predictive coding compression standard such as a HEVC, frames can be respectively compressed as different pictures in which prediction methods are different from each other such as I, P, and B, and can be respectively transmitted by being stored in different packets. However, it is not possible to identify whether the picture data stored in the packet is I, P, or B at the TS level. At this time, if there is the B picture that is not referred to for decoding of other pictures, even if the data of the B picture is removed, the playback can be performed. Thus, it is possible to appropriately remove the packet of the B picture data depending on ability of the client and to perform the playback by changing a frame rate for each client by utilizing this property. However, in a case of transmitting the packet using the TS, as described above, since the packet cannot be identified by the multiplexing separation unit, such a process cannot be performed.

As illustrated in FIG. 15(b), in the embodiment, the packets to which different PID are allocated can be recognized as the same content by allocating a RefPID (dependency identifier) indicating that those are the same content in addition to the PID in order to solve the above problem. Furthermore, in the embodiment, the packet includes a flag isRef indicating whether or not the packet includes a RefPID. The isRef is a binary flag, indicates that the RefPID is included in a case of 1, and indicates that the RefPID is not included in a case of 0.

FIG. 16 is a block diagram illustrating a main configuration of the embodiment. As illustrated in FIG. 16, the server includes a multiplexing unit that multiplexes the plurality of packets and the client includes the multiplexing separation unit that separates the stream in which the plurality of packets received from the server are multiplexed into individual packets. Moreover, in the server and the client illustrated in FIGS. 1 and 16, description regarding the same members will be appropriately omitted.

(Server)

A server transmission unit transmits the data to the client by wireless communication means or wired communication means.

A server control unit includes a content generation unit, a multiplexing unit, and a content transmission unit (transmission means) as functional blocks. Here, the content generation unit generates content data and outputs the content data to the content transmission unit by performing separation and multiplexing the content data to the packet in the multiplexing unit. For example, a value pid_b of the PID is allocated to the packet in which the P picture data is stored and a value pid_a of the PID is allocated to the packet in which the B picture data is stored. Furthermore, in the packet in which the B picture data is stored, the value of isRef is 1 and the RefPID of the value pid_b is allocated to the packet.

(Client)

A client receiving unit receives data from the server by wireless communication means or wired communication means.

A client control unit includes a content acquisition unit (acquisition means), a multiplexing separation unit, and a content playback unit as functional blocks. Here, the content acquisition unit acquires a multiplexing stream transmitted from the server and outputs the multiplexing stream to the multiplexing separation unit.

The multiplexing separation unit separates the multiplexing stream into respective packets. At this time, the multiplexing stream is separated to the packets such as video, audio, and program information by referring to the value of the PID.

Furthermore, the multiplexing separation unit determines whether the packet includes the RefPID and if the packet includes the RefPID, the data of the packet and the data of the packet that is indicated by the RefPID are interpreted as the data of one content. Then, the data of each content that is separated by the multiplexing separation unit is input into the content playback unit.

Moreover, at this time, in the data of the packet and the data of the packet that is indicated by the RefPID, transmission time information (not illustrated) is stored in each packet header and it is possible to determine the order uniquely by seeing the transmission time information. Otherwise, the order may be determined uniquely from the sequence number by storing the sequence number (not illustrated) in the packet header.

The content playback unit sequentially decodes the packet data of the video separated by the multiplexing separation unit according to the PID and RefPID into a video signal, appropriately rearranges decoded picture data to a display order, and then outputs the picture data in the display unit, respectively.

As described above, FIG. 17 is a diagram illustrating that the stream in which the I and P picture data and the B picture data are respectively stored and multiplexed in the packet of the value pid_b of the PID and the packet of the value pid_a of the PID is received, and the received multiplexed stream is multiplexed and separated to the content data in which the frame rate is different based on the PID and RefPID in the multiplexing separation unit of the client. At this time, the I and P picture data are encoded data of a frame rate of 60 Hz. On the other hand, the B picture data is additional data for performing the playback of 120 Hz by sandwiching one sheet of the B picture between pictures of the I and P picture data. Specifically, since the RefPID of pid_a is pid_b, and the playback of the video of 120 Hz is performed by outputting entire packets of the pid_a and the pid_b to a video decoder. On the other hand, if only the pid_b is output to the video decoder, the playback of video of 60 Hz is performed.

Moreover, in the embodiment, a configuration is provided in which the isRef and the RefPID are allocated to the packet header, but the storing position is not limited to the embodiment, and for example, the isRef and the RefPID may be described in the MPD that is stored in the MPD storage device illustrated in FIG. 16 similar to the description in the first embodiment. Otherwise, the isRef and the RefPID may be described as a part of metadata of transfer information regarding the transfer of the content or the playback information relating to the playback of the content instead of the MPD. Otherwise, furthermore, information indicating that the contents are the same content as each other may be described in a value of the PID and the RefPID is not allocated by using the PID also as the RefPID. Furthermore, a configuration may be adopted in which the RefPID is essential and the isRef is omitted.

An example is illustrated in FIG. 19(a) in which the isRef and the RefPID are stored in the transfer information based on a Program Association Table/Program Map Table (PAT/PMT) used in current digital broadcasting. Furthermore, an example is illustrated in FIG. 19(b) in which a plurality of PID are described instead of using the isRef and the RefPID. In a case of FIG. 19(b), the video is illustrated to be formed of data to which two PID are allocated and the PID that is written later is interpreted to depend on the PID that is written earlier. The multiplexing separation unit knows the PID of necessary data, separates only the packet data to which the PID is allocated from the multiplexing stream, and performs the playback thereof by using the transfer information.

Thus, the client can identify the packet including the same content holding different PID in the multiplexing stream and can decode the packet by acquiring required packet data according to decoding capability. In the above example, an example is illustrated in which the playback having different frame rates of 60 Hz and 120 Hz is performed from the packet storing the I and P picture data, and the B picture data. In addition, for example, in scalable coding, stream data of a low resolution base layer and stream data of a high resolution enhancement layer are stored in the packets having different PID and are identified using the PID and the RefPID. Thus, it is possible to perform a process in which the client having low decoding capability acquires data of the base layer and performs the playback of the low resolution video, and the client having high decoding capability acquires data of base and enhancement layer, and performs the playback of the high resolution video. It is possible to eliminate the delay occurring in the decoding by extracting the data having an appropriate frame rate and appropriate resolution depending on the decoding capability.

Furthermore, allocation of the PID and RefPID to the I, P, and B pictures is not limited to the above example, and as illustrated in FIG. 18, if the B picture consisting of a plurality of hierarchies is provided, the PID having a value pid_0 is allocated to the packet (hierarchy 0) of the I/P picture and the PID having a value of pid_1 is allocated to the packet of the B picture of the hierarchy 1. Similarly, the PID having values pid_2 and pid_3 may be allocated to the packet of the B picture of hierarchies 2 and 3. In this case, the RefPID having the value of pid_0 is allocated to the packet of the B picture of the hierarchy 1 and similarly, the RefPID having values of pid_1 and pid_2 is allocated to the packet of the B picture of the hierarchies 2 and 3.

In the above configuration, the acquisition means acquire the segment that is chunk-transferred in subsegment unit that is obtained by dividing the segment into a plurality of pieces in response to the request requiring the transmission of the segment. That is, the segment may be transmitted in subsegment unit that is shorter in time than in segment unit and it is possible to request the transmission of the plurality of subsegments in one request. Thus, it is possible to suppress an error process associated with pipelining of a plurality of requests while shortening the time until the distribution can be performed from the generation start of the subsegment.

Furthermore, in the content playback device according to an aspect of the invention, the segment may be divided into the subsegments so as to enable random access in subsegment unit.

Furthermore, in the content playback device according to an aspect of the invention, the acquisition means may specify a byte range of the subsegment including a part of the segment and transmit the request using a byte range template that designates the specified byte range in a case where the acquisition means transmits a request for requiring transmission of a part of the segment.

In the above configuration, if the acquisition means transmits the request requiring the transmission of a part of the segment, since the acquisition means transmits the request using the byte range template, the status code of the response to the request is "200". Thus, if the content is acquired through the proxy that is a relay device of the content, the proxy can cache the data included in the response. Thus, it is possible to reduce RTT and to stably realize the low delay live streaming.

Furthermore, according to an aspect of the invention, there is provided a content distribution system including the content transmission device and the content playback device.

In the above configuration, the content distribution system has the same effects as those of the content transmission device and the content playback device.

Furthermore, a data structure of the content management information is included in the scope of the invention, which is associated with the content constituted by a plurality of segments that are acquired by the content playback device from the content transmission device and in which the segment is divided into the plurality of subsegments, and which includes acquisition source information indicating the acquisition source of the content where the byte range template is described.

Moreover, the content transmission device and the content playback device may be realized by a computer. In this case, a control program in which the content transmission device and the content playback device are realized by the computer by causing the computer to function as each means of the content transmission device and the content playback device, and a computer readable recording medium in which the control program is stored are also included in the scope of the invention.

The invention is not limited to the embodiments described above and various modifications are possible within the scope of the claims. That is, embodiments obtained by combining technical means that are appropriately modified in the scope of the claims are also included within the technical scope of the invention.

[Realization Example by Software]

Finally, each block of the server 1 and the client 2, particularly, the server control unit 11 and the client control unit 41 may be realized as hardware by a logic circuit formed on an integrated circuit (IC chip) or may be realized as software using a Central Processing Unit (CPU).

In the latter case, the server 1 and the client 2 include the CPU that executes a command of a program realizing each function, a Read Only Memory (ROM) in which the program is stored, a Random Access Memory (RAM) that develops the program, a storage device (recording medium) such as a memory in which the program and various data are stored, and the like. Then, an object of the invention can also be achieved by supplying the computer readable recording medium to the server 1 and the client 2 on which a program code (executable program, intermediate code program, and source program) of a control program of the server 1 and the client 2 that are software realizing the above function is recorded and by reading and executing the program code that is recorded on the recording medium using the computer (or CPU or MPU).

As the recording medium described above, it is possible to use a non-transitory tangible medium, for example, tapes such as a magnetic tape or a cassette tape, disks including a magnetic disk such as a Floppy (registered trademark) disk/hard disk or an optical disk such as CD-ROM/MO/MD/DVD/CD-R, cards such as an IC card (including memory card)/optical card, semiconductor memories such as a mask ROM/EPROM/EEPROM (registered trademark)/flash ROM, or logic circuits such as a Programmable logic device (PLD) or a Field Programmable Gate Array (FPGA).

Furthermore, the server 1 and the client 2 may be configured to be capable of connecting to a communication network and the program code may be supplied through the communication network. The communication network may transmit the program code and is not specifically limited. For example, it is possible to use the Internet, an intranet, an extranet, a LAN, an ISDN, a VAN, a CATV communication network, a Virtual Private Network, a telephone line network, a mobile communication network, a satellite communication network, and the like. Furthermore, the transfer medium configuring the communication network is also not limited to a specific configuration or type as long as the transfer medium is a medium that is capable of transferring the program code. For example, the transmission of the program code also can be made in a wired manner such as an IEEE1394, USB, a power line carrier, a cable TV line, a telephone line, and an Asymmetric Digital Subscriber Line (ADSL), and in radio such as infrared such as IrDA and remote controller, Bluetooth (registered trademark), IEEE802.11 wireless, a High Data Rate (HDR), a Near Field Communication (NFC), a Digital Living Network Alliance (DLNA) (registered trademark), a mobile phone network, a satellite line, and a terrestrial digital network. Moreover, the invention can be realized in a form of a computer data signal in a carrier wave in which the program code is also realized in electronic transfer.

INDUSTRIAL APPLICABILITY

The invention can be used in the content transmission device that transmits the content of the MPEG-DASH standard and the content playback device that acquires the content and performs the playback of the content.

REFERENCE SIGNS LIST

1 server
2 client
3 proxy
4 MPD storage device
5 segment storage device
6 content distribution system
21 content acquisition unit
22 content transmission unit (transmission means)
51 content acquisition unit (acquisition means)
52 content playback unit

The invention claimed is:

1. A content transmission device that transmits live distribution content which is constituted by a plurality of segments to a content playback device, the content transmission device comprising:

management information transmission circuitry that transmits content management information which is described in respect to an offset indicated by a difference between a time when a segment is available and a time when at least a portion of the segment is available to the content playback device.

2. A content playback device that acquires live distribution content which is constituted by a plurality of segments and performs playback of the content, the content playback device comprising:

management information acquisition circuitry that acquires content management information which is described in respect to an offset indicated by a difference between a time when a segment is available and a time when at least a portion of the segment is available.

* * * * *